Figure 1:
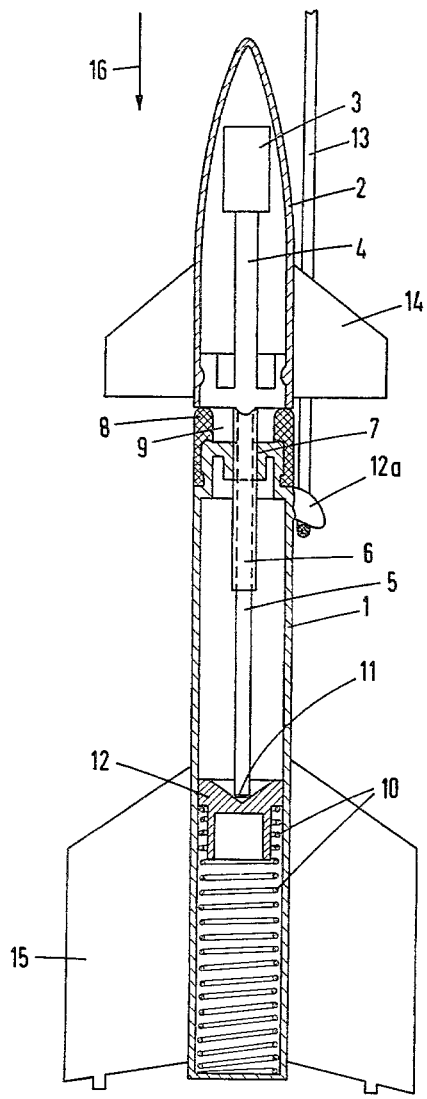
Figure 2:
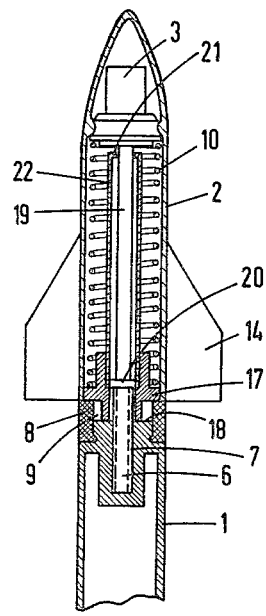
Figure 3:
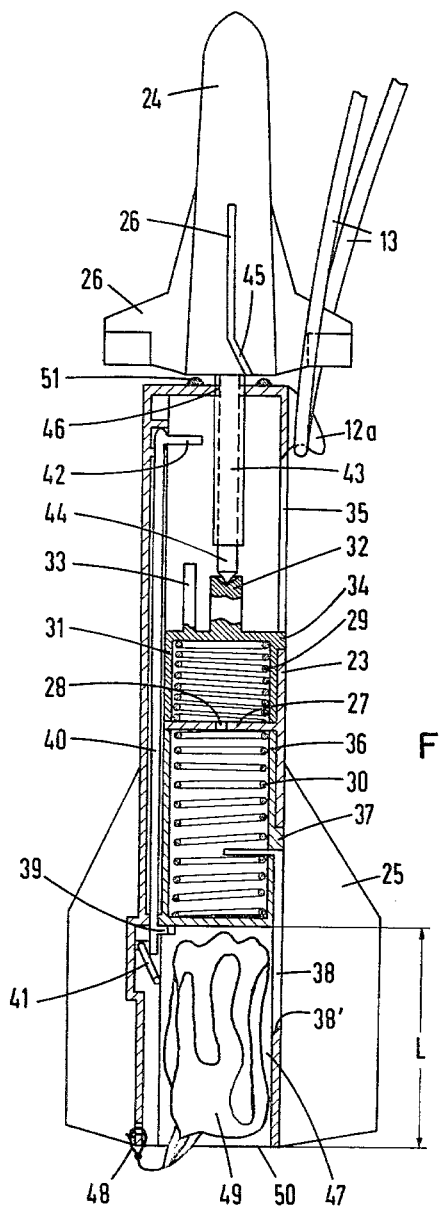

Jan. 11, 1966   H. K. BROSS   3,228,141
TOY ROCKET

Filed Nov. 9, 1964   2 Sheets-Sheet 1

Inventor:
Helmut Karl Bross
By: Spencer & Kaye
Attorneys 3,228,141
TOY ROCKET
Helmut Karl Bross, Altenberg, near Nurnberg, Germany, assignor to Metallwarenfabrik Dr. Adolf Kurschner, Furth, Bavaria, Germany
Filed Nov. 9, 1964, Ser. No. 409,731
Claims priority, application Germany, July 7, 1964, B 77,561
12 Claims. (Cl. 46—86)

The present invention relates to a toy rocket which comprises an upper and a lower rocket stage, and retarding means which insure that the upper rocket stage will not be separated from and propelled off the lower stage by the action of a driving force, for example, the pressure of a spring, until the entire rocket has been in flight for a certain length of time.

There is a two-stage rocket of a similar type already known which is provided with a pneumatic retarding device for separating the two rocket stages from each other at a certain time after the rocket has been launched. This rocket, however, requires a separate launching stand which holds the two rocket stages in a locked position until the rocket is actually launched. Furthermore, the construction of this known rocket has to be carried out with high precision especially as regards the cylinder elements and the pistons which must slide airtight within each other.

It is an object of the present invention to provide a toy rocket of the type as first described which may be produced in a very simple manner and at a low cost and may also be very easily operated. For attaining this object, the invention provides that the retarding means consist of a screw and associated nut member which connect the two rocket stages to each other and one of which is acted upon by a driving force, for example, the pressure of a spring, which tends to unscrew the two rocket stages from each other. The threads of this screw and its associated nut member may be either coarse and reversible or square and self-locking. In the latter case, the two threaded parts are disconnected from each other by the action of the air stream upon the fins of the rocket. If the screw threads are coarse and reversible, however, the invention provides that at least the fins of the upper rocket stage may be designed so as to have sufficient inertia by increasing their weight at their radially outer ends, for example, by making these parts of a greater thickness.

In the same case, that is, when the screw threads are coarse and reversible, the invention further provides that at least the fins of the upper rocket stage may be given a negative angle of incidence relative to the direction of the air flow, which has the tendency to retard the unscrewing of the upper rocket stage from the lower stage in consequence of the diminishing speed of the rocket during its flight. In this case it will not be necessary to make the fins of the rocket of a greater weight.

If the associated screw threads are square and self-locking, another feature of the invention provides that at least the fins of the upper rocket stage may be given such an angle of incidence relative to the direction of the air flow that the upper rocket stage will be unscrewed from the lower stage by the relative wind. The fins of the lower rocket stage may in all cases be given an angle of incidence opposite to that of the upper rocket stage.

The required driving force, for example, that of a compression spring, which tends to unscrew the two rocket stages from each other, and a pressure-transmitting member, for example, in the form of a piston, which is acted upon by this force may be located within the lower rocket stage, while the upper end of this lower stage may be provided with a nut portion into which the thread of a screw engages which projects downwardly from the upper rocket stage. Of course, it is also possible to provide the driving force, for example, a compression spring, and a rod with a threaded end in the upper rocket stage. The threaded part of this rod may then engage into a nut portion on the upper end of the lower rocket stage, while the lower end of the compression spring may act upon a pressure-transmitting member, for example, in the form of a piston which has a tubular part guided on the rod. The threaded rod and the tubular part should then be provided with stops to prevent the piston-like member from being completely separated from the rod.

The upper end of the lower rocket stage may be provided with a sleevelike resilient cushion of such a diameter that, when the two rocket stages are screwed together, this cushion will prevent them from being unscrewed of their own accord so that the entire rocket will be in a condition ready to be launched. This cushion has the additional purpose of taking up the impact of landing of the lower rocket stage and of then also protecting the nut portion near the upper end thereof from being soiled by the ground.

The lower rocket stage may be made in the form of a conventional rocket which contains a pressure chamber and a nozzle and is driven by hydraulic ejection. It is also possible to design the lower rocket stage as a launching aircraft and the upper rocket stage as a filial aircraft or a rocket which is shot off from the lower rocket stage.

In order to insure that the entire rocket as well as both rocket stages will have a good flight stability, it is advisable to provide each of them with a relatively heavy head and with large tail fins.

Another feature of the invention consists in providing the lower rocket stage with a parachute which may be ejected by a spring from an opening in the lower end of this stage after the upper rocket stage has been propelled off the lower stage. The lower rocket stage is for this purpose provided with a compartment with an open lower end into which the parachute is inserted and the movable bottom of which is formed by an ejecting piston which is acted upon by the mentioned spring and is held in a locked position by a bolt which is unlocked by a retarding mechanism after the upper rocket stage has left the lower stage. The locking bolt is for this purpose provided in the form of a lateral projection on the lower end of a rod which is mounted in the lower rocket stage so as to be rotatable about its axis and has an arm on its upper end against which a cam surface is adapted to engage which is provided on the main spring-loaded piston which tends to unscrew the upper rocket stage from the lower stage. Immediately after the upper rocket stage has been unscrewed from the lower stage by the pressure of the main piston against the end of the screw on the lower end of the upper rocket stage, the cam surface on this piston engages upon and slides along the arm of the rod and thereby turns the latter about its axis. By this turn, the lateral locking projection on this rod is likewise turned and thereby disengages from and releases the ejection piston which by the action of its spring then ejects the parachute so that the latter will unfold and carry the lower rocket stage safely to the ground.

The features and advantages of the present invention will become more clearly apparent from the following detailed description thereof which is to be read with reference to the accompanying drawings, in which:

FIGURE I shows an axial section of a toy rocket according to the invention;

FIGURE II shows an axial section of a modification of the toy rocket according to the invention; while FIGURE III shows an axial section of another modification of the invention in the form of a parachute-equipped toy rocket.

Each of the two toy rockets as illustrated in FIGURES I and II has a lower rocket stage 1 and an upper rocket stage 2. The upper rocket stage 2 of FIGURE I is provided with a weight member 3 which forms a part of an insert 4, and a rod 5 which is provided with a screw thread 6 which is screwed into a tapped bore 7 in the upper end of the lower rocket stage 1. The threaded parts 6 and 7 are therefore positively connected to the upper and lower rocket stages, respectively. The upper end of the rocket stage 1 carries an impact-absorbing cushion 8 of a resilient material which has a central aperture 9 and projects above the tapped bore 7 so as to protect the latter from being soiled when the lower rocket stage 1 hits the ground. The lower rocket stage is further provided with a compression spring 10 which serves as a force for separating the two rocket stages from each other and for then propelling the upper from the lower stage. This compression spring 10 acts upon a piston 12 which, in turn, acts upon the tip 11 of the rod 5. Near its upper end, the lower rocket 1 is provided on the outside with a hook 12a over which a rubber cord 13 may be hooked for launching the rocket. By engaging with one of the tail fins 14 of the upper rocket stage 2, this rubber cord 13 prevents the latter from being unscrewed from the lower rocket stage 1 before the rocket is actually launched. The lower rocket stage 1 is likewise provided with fins 15.

If the screw threads 6 and 7 are not of the self-locking type, the inertia of the rotary mass of the parts 2, 3, and 14 and the action of the air flow on the tail fins 14 delays the time when the upper rocket stage is unscrewed from the lower stage as long as may be desired. The fins 14 may in addition also be weighted, for example, by being made of a greater thickness or by being provided with thickened parts. They may preferably also be given such a propellerlike angle of incidence relative to the direction of the air flow 16 that the unscrewing movement will be additionally retarded in accordance with the diminishing air speed of the rocket during its flight.

If the screw threads are of the self-locking type, the fins 14 are given such an angle of incidence relative to the direction of the air flow 16 that the upper rocket stage 2 will be unscrewed from the lower stage by the drag of the relative wind.

In the toy rocket as illustrated in FIGURE II, the compression spring 10 which serves as a force for separating the two rocket stages is mounted in the upper rocket stage 2 and acts upon a piston 17 which, in turn, acts upon the front surface 18 of the lower rocket stage 1. The upper rocket stage also carries a rod 19 which extends through the spring 10 and has a flange 20 thereon and on its lower end underneath this flange a screw thread 6. After the two rocket stages are separated, flange 20 engages with a stop 21 on the upper end of a tubular member 22 which is secured to the piston 17. This stop 21 prevents the piston 17 from being separated entirely from the threaded part 6. In addition, flange 20 maintains the spring 10 under an initial compression.

The lower rocket stage 1 according to FIGURE II may again be provided with a hook 12a in the same manner as shown in FIGURE I. If the screw threads 6 and 7 are of a self-locking type, the lower rocket stage 1 may, however, also be provided with a chamber and a nozzle at the lower end for the purpose of providing the rocket with a drive by hydraulic pressure.

FIGURE III illustrates a parachute-equipped rocket with a lower rocket stage 23 and an upper rocket stage 24. Both rocket stages 23 and 24 are provided with fins 25 and 26. The lower rocket stage 23 has on its upper end a hook 12a over which a rubber cord 13 may be hooked for launching the rocket. The lower rocket stage is further provided with a partition 27 which has a narrow air passage 28 and serves as a support for two compression springs 29 and 30. Spring 29 acts upon a piston 31 which has two projections 32 and 33 on its upper end. The projection 32 has a conical recess in its upper end and the projection 33 is tapered toward its upper end. Piston 31 is slidable longitudinally within the tubular housing of the lower rocket stage, but it is prevented from turning therein by having a radial projection 34 which engages into a longitudinal slot 35 in the wall of this housing.

The compression spring 30 which serves as an ejection spring acts upon a cup-shaped ejection piston 36 which is likewise nonrotatably guided by having a radial projection which engages into a slot 38 in the wall of the housing of the lower rocket stage. The lower end 38' of the slot 38 serves as a stop to limit the extent of the movement of piston 36. When the cup-shaped piston 36 is depressed to the position as shown in FIGURE III, it is locked by a bolt 39 which forms a projection on a rod 40 which is rotatably mounted in the lower rocket stages and acted upon by a diagonally extending rubber cord 41 or the like which tends to turn the rod 40 in the direction in which the bolt 39 locks the piston 36 in its depressed position. The upper end of the rod 40 has an arm 42 which, when the piston 31 moves upwardly and the tapered projection 33 slides along the arm 42, turns the rod 40 about its axis so that the bolt 39 releases the piston 36. The air passage 28 in the partition 27 throttles the impact of the cup-shaped piston 36 when accidentally released.

The upper rocket stage 24 is provided with a threaded rod 43 which has an unthreaded end portion 44, the pointed tip of which engages upon the center of the conical recess in the upper end of the projection 32. For increasing the inertia of the upper rocket stage 24, the fins 26 may be weighted at their outer ends. These fins are also provided with obliquely inclined parts 45 which by the action of the air flow thereon prevent the upper rocket stage from being unscrewed from the lower stage during the early part of the flight. The screw threads on rod 43 and the tapped bore 46 in the lower rocket stage 23 may be coarse and reversible.

The space within the lower rocket stage 23 underneath the ejecting piston 36 forms a compartment 47 into which a parachute 49 may be inserted which is attached at 48 to the lower end of the lower rocket stage 23. The depth L of the parachute compartment 47 from its open end 50 to the bottom of the piston 36 in the fully depressed position is preferably less than the length of a finger.

For launching the rocket according to FIGURE III, the threaded rod 43 on the upper rocket stage 23 is first screwed into the lower rocket stage 23 against the action of spring 29 until it is gripped tightly by an intermediate rubber ring 51. The lower piston 36 is then inserted into the opening 50 and pushed by a finger against the action of spring 30 into the compartment 47 until its upper end engages upon the partition 27 and the bolt 39 is turned inwardly and locks the piston 36 in the depressed position. Thereafter, the parachute 49 is inserted into the compartment 47. The launching rubber cord 13 is then attached in the conventional manner to the hook 12a, whereupon the upper rocket stage is slightly turned relatively to the lower stage so as to loosen it from the rubber ring 51. Until the rocket is launched, one of the fins 26 engages against the rubber cord 13 which thus prevents the upper rocket stage from being turned and unscrewed from the lower stage. Immediately after it is launched, the rocket will have its maximum flying speed. The air current hitting against the oblique surfaces 45 of the fins of the upper rocket stage will then produce a torque in the latter which counteracts the torque in the opposite direction which is produced by the compression spring 29 and the coarse screw threads 43 and 46. When the flying speed of the rocket decreases, the torque produced by the action of the relative wind upon the oblique surfaces 45 of the fins of the upper rocket stage diminishes with the result that the upper rocket stage 24 will be unscrewed from the lower stage 23. The tapered surface of the projection 33 on piston 31 then engages against the arm 42 and thereby turns the rod 40 about its axis so that the locking bolt 39 is likewise turned and releases the lower piston 36 which is then pushed downwardly by the compression spring 30 and thereby ejects the parachute 49 from the compartment 47. The parachute 47 then opens and slows down the decent of the lower rocket stage 23 which will then float safely down to the ground. The upper rocket stage, however, continues its flight and may even be given an additional forward impulse by the residual thrust of the compression spring 29 upon the threadless end portion 44 of the screw 43 after the latter is unscrewed from the tapped bore 46 of the lower rocket stage.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A toy rocket having an upper rocket stage and a lower rocket stage, and means for separating and propelling the upper rocket stage from the lower stage after the rocket has been in flight for a certain length of time, said means comprising associated screw and nut members on said two rocket stages, respectively, pressure producing means acting upon one of said members and thereby tending to rotate the upper stage in one direction relatively to the lower stage and thus to unscrew the two stages from each other, and means for producing a force during the first part of the flight of said rocket which counteracts said rotation.

2. A toy rocket as defined in claim 1, in which said associated screw and nut members have self-locking screw threads, said force producing means on said upper rocket stage comprising fins on said upper stage having a shape tending to turn said upper stage under the action of a strong relative wind in the direction opposite to said first direction.

3. A toy rocket as defined in claim 1, in which said associated screw and nut members have coarse reversible screw threads, said force producing means comprising fins at least on the upper rocket stage having an inertia-increasing weight at their radially outer ends tending to resist the unscrewing rotation of said upper stage for a certain length of time after the rocket is launched in accordance with the flying speed of the rocket.

4. A toy rocket as defined in claim 1, in which said associated screw and nut members have coarse reversible screw threads, said force producing means comprising fins at least on the upper rocket stage having a negative angle of incidence relative to the direction of the relative wind tending to prevent the upper rocket stage from being unscrewed from the lower stage with a force depending upon the air speed of the rocket.

5. A toy rocket as defined in claim 1, in which said associated screw and nut members have square self-locking screw threads, said force producing means comprising fins having an angle of incidence of such a size relative to the directions of the relative wind as to produce a rotation of said upper stage in the direction in which it is unscrewed from the lower stage.

6. A toy rocket as defined in claim 1, in which said force producing means comprise fins on said upper and lower rocket stages having an angle of incidence relative to the direction of the relative wind, said angle on one stage being opposite to the angle on the other stage.

7. A toy rocket as defined in claim 1, in which said pressure producing means and a pistonlike member acted upon by said means are located within the lower rocket stage, said nut member being secured to the upper end of said lower rocket stage and said screw being secured to and projecting downwardly from said upper rocket stage and adapted to be screwed into said nut member.

8. A toy rocket as defined in claim 1, in which said pressure producing means comprise a compression spring within said upper rocket stage, said screw comprising a rod secured within said upper stage near the upper end thereof and extending through said spring and having a threaded part on its lower end projecting from the lower end of said upper stage and adapted to be screwed into said nut member on the uper end of said lower rocket stage, a pistonlike member acted upon by the lower end of said spring, and a tubular member surrounding and slidable longitudinally along said rod and secured at its lower end to said pistonlike member and adapted to guide the latter, and stop means on said rod and on said tubular member for preventing said pistonlike member from being entirely disconnected from said rod.

9. A toy rocket as defined in claim 1, further comprising a tubular cushion on the upper end of the lower rocket stage adapted to engage with and to adhere to the lower end of said upper rocket stage when said two stages are screwed together so as to prevent the upper rocket stage from being unscrewed before the rocket is launched, said cushion also adapted to act as a shock absorber to reduce the impact on said lower rocket stage when landing.

10. A toy rocket as defined in claim 7, further comprising a compartment in the lower rocket stage having an opening in its lower end, a parachute adapted to be connected to the lower end of said lower rocket stage and to be inserted through said opening into said compartment, spring-loaded means for ejecting said parachute from said compartment, and means for releasing said ejecting means so as to eject said parachute when said two rocket stages are unscrewed from each other.

11. A toy rocket as defined in claim 10, in which said ejecting means comprise a second pistonlike member slidable within said compartment and a compression spring within said compartment acting upon said second pistonlike member, said releasing means comprising a locking member adapted to maintain said second pistonlike member and its spring in the compressed position during the first part of the flight of said rocket, and means adapted to be acted upon by said first pistonlike member near the end of its movement for unscrewing said upper rocket stage from said lower stage to move said locking member so as to release said second pistonlike member to eject said parachute.

12. A toy rocket as defined in claim 10, in which said ejecting means comprise a second pistonlike member slidable within said compartment, and a compression spring within said compartment acting upon said second pistonlike member, said releasing means comprising a tapered part on the upper end of said first pistonlike member, a rod extending longitudinally along said lower rocket stage and being mounted thereon so as to be rotatable about its axis, said rod having a lateral arm near its upper end and a lateral locking projection near its lower end, and resilient means for turning said rod so that said locking projection engages with said second pistonlike member so as to lock the same in its compressed position, said tapered part on said first pistonlike member adapted near the end of the movement of said member for unscrewing said upper rocket stage from said lower stage to engage against said lateral arm and thereby to turn said rod, whereby said locking projection is turned away from said second piston-like member which is thereby released to eject said parachute.

References Cited by the Examiner

UNITED STATES PATENTS 3,084,476  4/1963  Sunray _____ 46—81 X

FOREIGN PATENTS 186,374  9/1922  Great Britain.
87,775  9/1919  Switzerland.

RICHARD C. PINKHAM, *Primary Examiner.*